United States Patent [19]

Nielsen et al.

[11] Patent Number: 5,297,854

[45] Date of Patent: Mar. 29, 1994

[54] WHEEL COVER RETENTION SYSTEM

[75] Inventors: Gerald A. Nielsen, Big Rapids; Gregory R. Hauler, Grand Rapids, both of Mich.

[73] Assignee: Big Rapids Products, Inc., Big Rapids, Mich.

[21] Appl. No.: 962,877

[22] Filed: Oct. 19, 1992

[51] Int. Cl.⁵ .............................. B60B 7/06
[52] U.S. Cl. .................... 301/37.37; 301/37.42
[58] Field of Search .............. 301/37.1, 37.29, 37.31, 301/37.34, 37.37, 37.42

[56] References Cited

U.S. PATENT DOCUMENTS

| | | |
|---|---|---|
| 1,320,551 | 11/1919 | Holley . |
| 2,217,086 | 10/1940 | Whitacre . |
| 2,576,683 | 11/1951 | Horn . |
| 2,819,929 | 1/1958 | Hunt . |
| 2,973,226 | 2/1961 | Ellies . |
| 3,111,347 | 11/1963 | Miller et al. . |
| 3,135,558 | 6/1964 | Johnston, Jr. et al. . |
| 3,548,704 | 12/1970 | Kutryk . |
| 3,554,536 | 1/1971 | Richter . |
| 3,561,820 | 2/1971 | Chaivre . |
| 3,569,695 | 3/1971 | McLean . |
| 4,012,078 | 3/1977 | Meyers . |
| 4,123,111 | 10/1978 | Renz et al. . |
| 4,133,583 | 1/1979 | Spisak . |
| 4,217,003 | 8/1980 | Main . |
| 4,235,476 | 11/1980 | Arvidsson . |
| 4,316,638 | 2/1982 | Spisak . |
| 4,382,635 | 5/1983 | Brown et al. . |
| 4,447,091 | 5/1984 | Nguyen et al. . |
| 4,457,560 | 7/1984 | Rowe et al. . |
| 4,458,952 | 7/1984 | Foster et al. . |
| 4,547,021 | 10/1985 | Abbate Daga . |
| 4,603,914 | 8/1986 | Brown et al. . |
| 4,707,035 | 11/1987 | Kondo et al. . |
| 4,842,339 | 6/1989 | Roulinson . |
| 4,895,415 | 1/1990 | Stay et al. . |
| 4,962,968 | 10/1990 | Caplin . |
| 4,998,780 | 3/1991 | Eshler et al. . |
| 5,022,710 | 6/1991 | Groppo . |
| 5,048,898 | 9/1991 | Russell . |
| 5,071,197 | 12/1991 | Webster et al. . |
| 5,082,409 | 1/1992 | Bias . |

FOREIGN PATENT DOCUMENTS

| | | |
|---|---|---|
| 2510045 | 1/1983 | France . |
| 102702 | 6/1980 | Japan . |
| 184901 | 9/1987 | Japan . |
| 176701 | 7/1988 | Japan . |
| 48489 | 12/1909 | Switzerland . |

*Primary Examiner*—Russell D. Stormer
*Attorney, Agent, or Firm*—Price, Heneveld, Cooper, DeWitt & Litton

[57] ABSTRACT

A wheel cover for a vehicle with a wheel secured to the vehicle by lug nuts, the wheel cover including a molded wheel cover base adapted to aesthetically cover the vehicle wheel, and a plurality of retainers attached to the wheel cover base. The wheel cover base includes a plurality of protrusions located in positions corresponding to the lug nuts and cylindrically-shaped walls extending around each protrusion creating a cup-shaped space for receiving the retainers. The retainers include a central body sized to fit in the space and a plurality of fingers extending from the central body for frictionally engaging lug nuts, the central body and fingers each including barbs for engaging the protrusions and the concentric walls so that the retainers are permanently retained to the wheel cover base once pressed into the space, the barbs creating an opposing arrangement of attachment in the space that creates a continuous minimum level of retention force despite different thermal expansion of the retainer and the wheel cover base. In one form, the wheel cover includes only three retainers thus saving material and part cost, the fingers of the one retainer remotely positioned from the other retainers receiving added support from the concentric wall positioned around the remote retainer to balance the overall retention force of the wheel cover on the vehicle wheel.

44 Claims, 5 Drawing Sheets

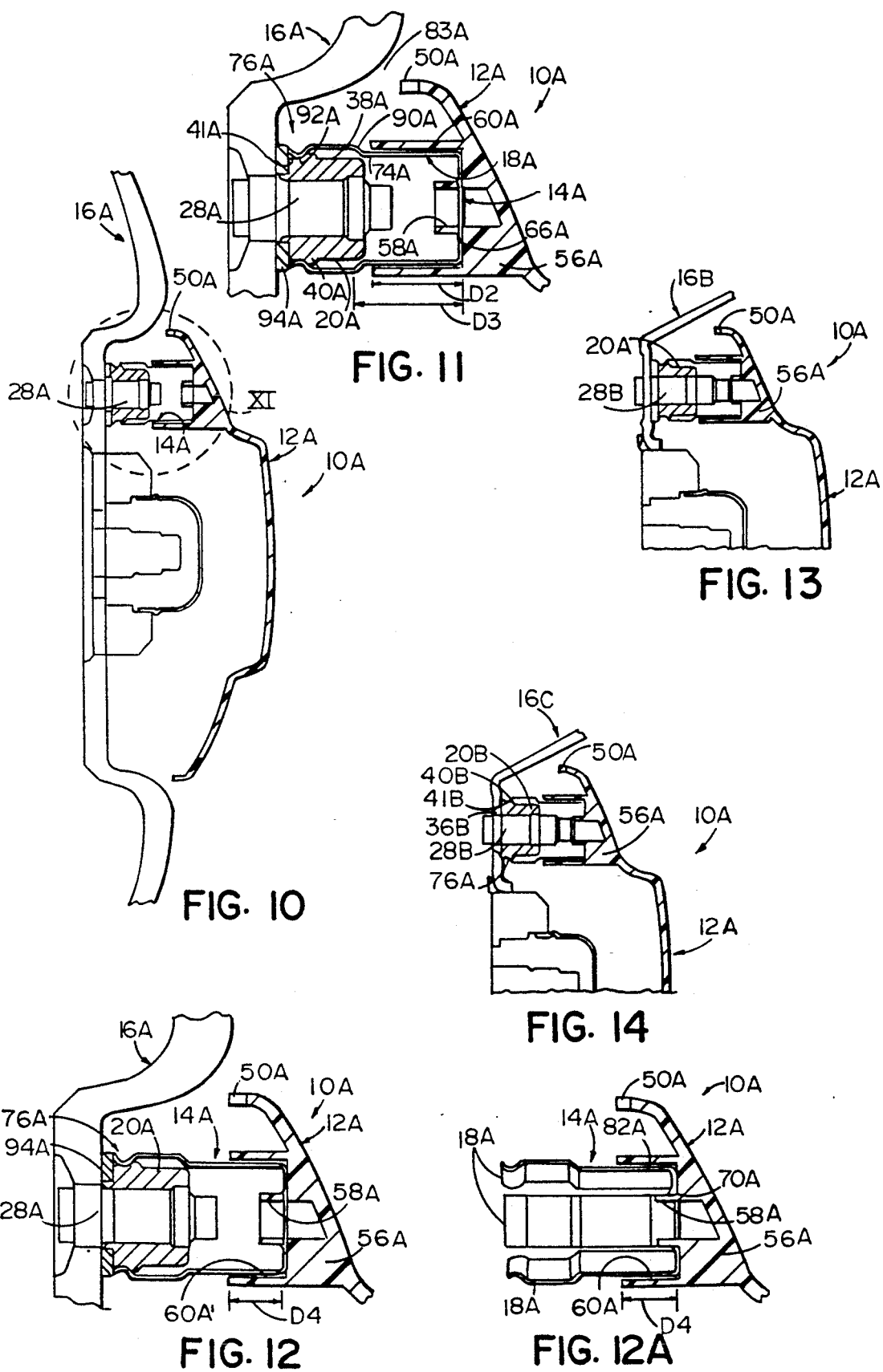

5,297,854

WHEEL COVER RETENTION SYSTEM

BACKGROUND OF THE INVENTION

The present invention relates to wheel covers for vehicles and, in particular, to a wheel cover having a novel retention structure.

Plastic wheel covers are very desirable since they permit distinctively designed parts to be made at relatively low cost, even with low production volumes. Further, plastic wheel covers have a low weight, and can be readily finished in a number of ways such as plating and/or painting to create an infinite variety of styles. Such covers typically include plastic projections projecting from the rear surface thereof, the projections defining fingers which engage and grip a lug nut or the vehicle wheel.

However, plastic is a relatively low strength material which tends to relax and/or creep over time and with high temperature, and further tends to become brittle over time and with low temperature. The integral plastic fingers weaken and/or break over time, thus reducing their grip on the lug nuts while in service. Also, a plastic wheel cover expands at a different rate of thermal expansion than the vehicle wheel to which it is attached, further aggravating the aforementioned problems. These problems have resulted in high warranty costs from failed plastic wheel covers, and have resulted in customer dissatisfaction from failed or lost wheel covers. Attempts to -resolve these problems have led to increases in the cost and complexity of retention systems to secure the wheel covers to the wheel.

Thus, an improved wheel cover is desired for solving the aforementioned problems.

SUMMARY OF THE INVENTION

The present invention comprises a wheel cover held in place by wheeling nut engaging retainers each of which includes a nut embracing portion. Each retainer is held in place on the wheel cover within a cup on the back of the wheel cover which is defined by a wall at least partially extending around and embracing said retainer, including a part of the axial length of the nut embracing portion of the retainer, whereby the cup wall not only holds the retainer in place, but also stiffens the nut embracing portion thereof, yet leaves a part of the nut embracing portion projecting beyond the cup wall such that it can flex over a wheel nut. As a result of this invention, the wheel cover can be made of one material, i.e. a plastic, and the retainer itself can be made of a more durable resilient material, such as metal or such as more sophisticated plastic.

These and other features, advantages and objects of the present invention will be further understood and appreciated by those skilled in the art by reference to the following specification, claims and appended drawings.

BRIEF DESCRIPTION OF THE DRAWINGS

FIG. 10 is a side cross-sectional view of the modified wheel cover shown in FIG. 9, the modified wheel cover including a modified retainer for gripping a secondtype lug nut and being shown as installed on a second-type vehicle wheel;

FIG. 11 is an enlarged view of the circled portion XI in FIG. 10;

FIG. 12 is a view similar to FIG. 11 but showing a modified outer wall for receiving a retainer;

FIG. 12A is a fragmentary cross-sectional view of the modified wheel cover, FIG. 12A being comparable to FIG. 12 with the vehicle wheel, stud and lug nut being removed for clarity;

FIG. 13 is a partial side cross-sectional view of he modified wheel cover, the view being similar to FIG. 10 but showing the modified wheel cover as being installed on a third-type vehicle wheel; and FIG. 14 is a partial side cross-sectional view of the modified wheel cover, the view being similar to FIG. 10 but showing the modified wheel cover as being installed on a third-type lug nut and on a fourth type vehicle wheel.

DETAILED DESCRIPTION OF THE PREFERRED EMBODIMENT

Figure 1:
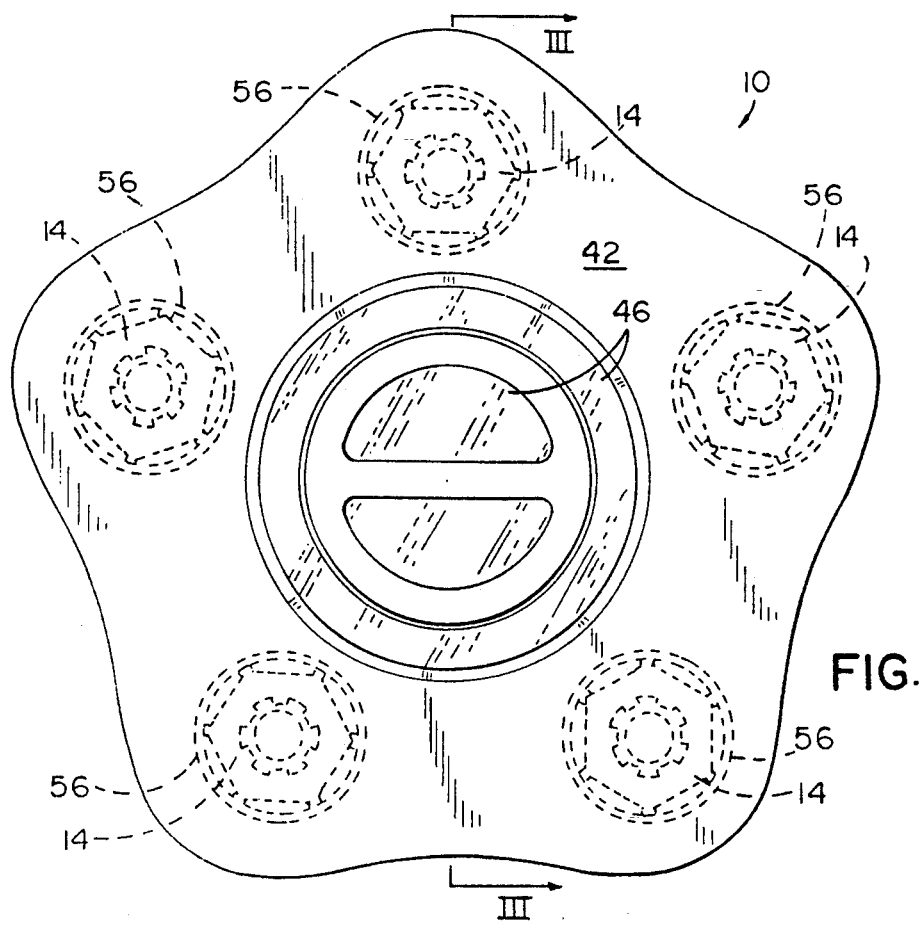
FIG. 1 is a plan view of a wheel cover embodying the present invention.
Figure 9:
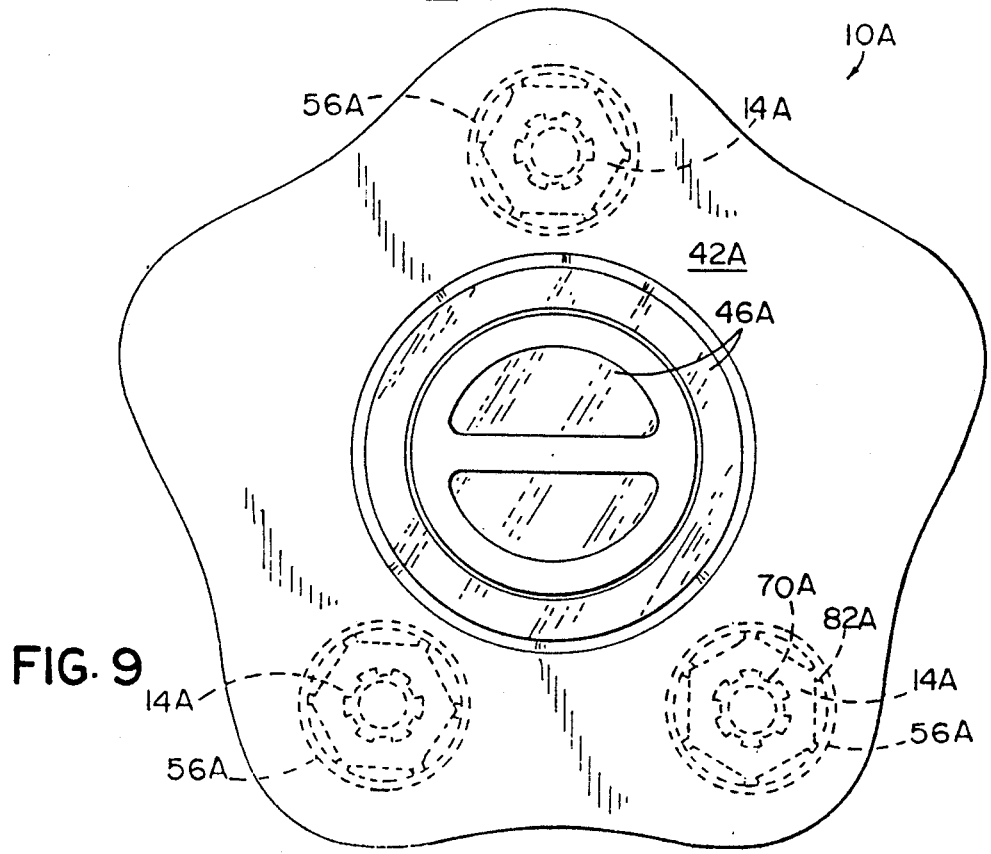
FIG. 9 is a plan view of a modified wheel cover embodying the present invention.

The preferred embodiment wheel cover 10 (FIG. 1) includes a wheel cover base 12 and a plurality of retainers 14 attached to the backside of the base 12 for retaining wheel cover 10 in position adjacent a vehicle wheel 16 (FIG. 2), retainers 14 including fingers 18 adapted to frictionally engage lug nuts 20 which hold vehicle wheel 16 on the vehicle. Retainers 14 are securely attached to wheel cover base 12 in a novel manner designed to reduce the complexity and number of parts and subassembly operations required to manufacture the wheel cover. Further, by the arrangement disclosed, the stress on the plastic wheel cover base 12 is minimized and distributed so that the service life of the wheel cover as a whole is maximized despite wide variations in environmental temperatures and conditions, and other in-service stressing conditions, as discussed below.

It is contemplated that a variety of different lug nuts and wheels could be used with wheel cover 10. The particular illustrated forged wheel 16 includes a hub 22 and a tire carrying rim 24, with hub 22 having a pattern of holes 26 for receiving studs 28 that extend laterally from the vehicle axle assembly (not shown). With wheel 16 mounted on studs 28 against the end of the vehicle axle assembly, lug nuts 20 are secured on studs 28 to retain wheel 16 on the vehicle.

Figure 2:
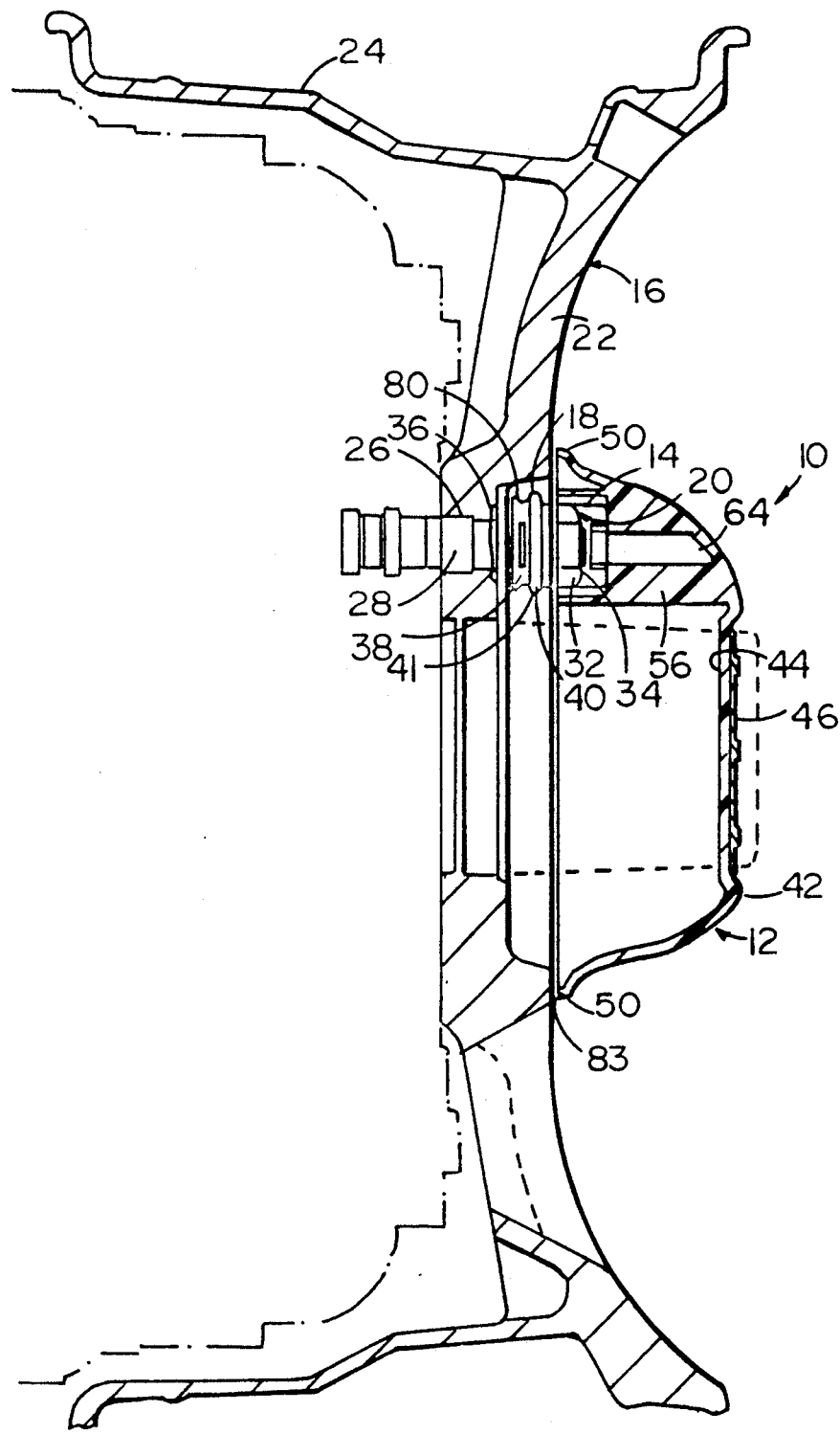
FIG. 2 is a side cross-sectional view of the wheel cover illustrated in FIG. 1 shown as installed on a vehicle wheel.

In the illustrated version shown in FIG. 2, lug nuts 20 each include a hex head 32, a threaded internal bore 34 for engaging studs 28, and a wheel engaging surface 36. Lug nuts 20 further include an outer cylindrically-shaped surface 38 extending between wheel engaging outer surface 36 and hex head 32. Outer surface 38 includes an outwardly extending ring-like ridge 40 which is spaced from and located between wheel engaging surface 36 and hex head 32, ridge 40 providing an engageable surface 41 for retainers 14 to frictionally engage as noted below.

Figure 3:
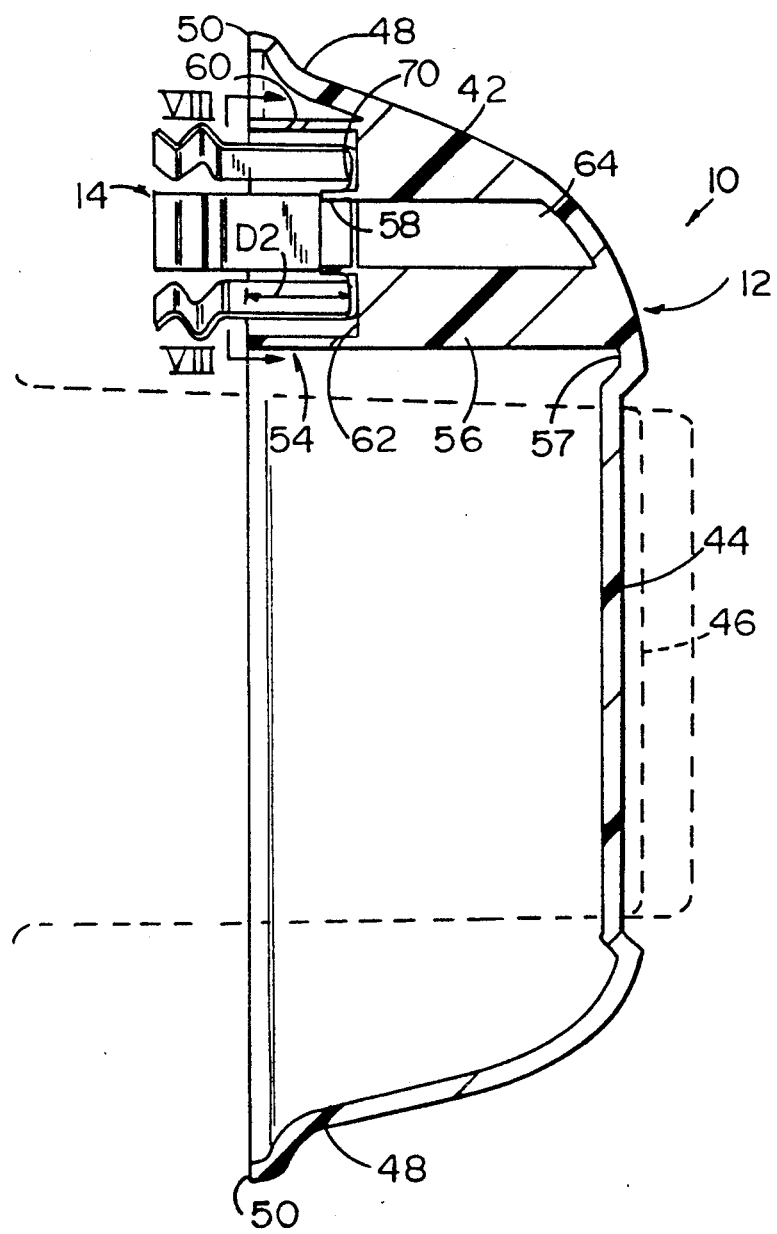
FIG. 3 is a cross-sectional view taken along the plane III—III in FIG. 1, some of the lines from a retainer on the wheel cover having been removed for clarity.

Wheel cover base 12 (FIG. 3) is a plastic part injection molded of ABS plastic or the like. Base 12 has a stylized outer surface 42 which, in the particular wheel cover shown, includes a planar central area 44 for receiving a logo-bearing insert 46. A radially extending wall 48 extends outwardly from central area 44 at least far enough to cover studs 28 and lug nuts 20, with radially extending wall 48 terminating in a rim or edge 50 that lies either against or more preferably a small distance spaced from wheel 16.

The present invention primarily concerns retainers 14 and their attachment to and relationship with wheel cover base 12. Wheel cover base 12 (FIG. 3) includes on its backside a plurality of retaining means 54 for securely retaining retainers 14 to wheel cover base 12. Retaining means 54 includes a boss-like supporting structure 56 that extends from wheel cover base backside surface 57 axially parallel to studs 28, and further includes a hollow protrusion 58 and a concentric cylindrically-shaped outer wall 60, protrusion 58 and outer wall 60 extending from end surface 62 of supporting structure 56. Optimally, a hole 64 extends through protrusion 58 and partially into supporting structure 56. This facilitates injection molding of wheel cover base 12 since hole 64 is in-line with the mold open direction thus eliminating a need for mold slides or cams, and further since hole 64 eliminates large mass concentrations which tend to cause poor part quality in the form of sinks in the part. However, it is contemplated that hole 64 could be eliminated or, alternatively, that supporting structure 56 could be made in a number of different configurations. Notably, protrusion 58 extends only about ⅓ the height of the outer wall 60, thus allowing outer wall 60 to define a pocket for partially receiving a particular lug nut 20.

Figure 5:
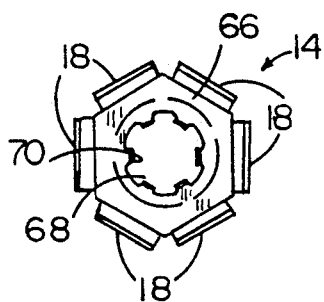
FIG. 5 is an end view of the retainer shown in FIG. 4.
Figure 4:
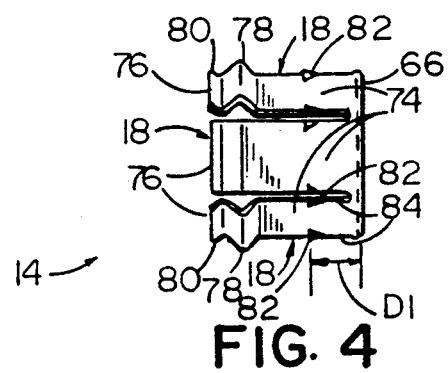
FIG. 4 is a side view of the retainer shown in FIG. 3.
Figure 6:
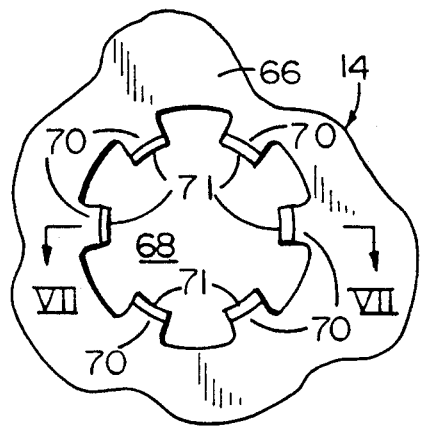
FIG. 6 is an enlarged fragmentary view of the retainer shown in FIG. 5.
Figure 7:
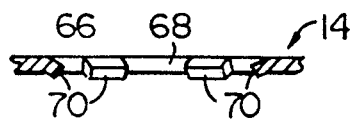
FIG. 7 is a cross-sectional view taken along the plane VII—VII in FIG. 6.
Figure 8:
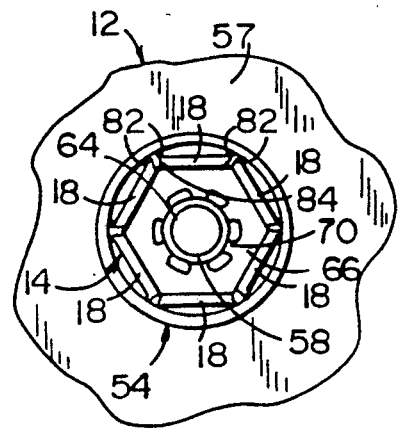
FIG. 8 is a partial cross-sectional view taken along the plane VIII—VIII in FIG. 3.

Each retainer 14 (FIGS. 4–7) has an identical cup-shape, and includes a planar central body 66 having a shape roughly equivalent to, but slightly smaller than, the space defined between protrusion 58 and outer wall 60 (FIG. 8). Retainer 14 (FIG. 4) further includes a plurality of fingers 18, namely six, that extend perpendicularly from the edges of central body 66. Planar central body 66 has a centrally located aperture 68 defined therein (FIG. 5), with barbs 70 extending inwardly from the marginal edge of aperture 68. Barbs 70 are bent slightly out of the plane of central body 66 (FIG. 7) in the same direction as fingers 18, and include ends 71 that define a diameter so that ends 71 can slideably receive protrusion 58 in a first direction, but which will bite into and securely hold retainer 14 on protrusion 58 once installed.

Fingers 18 (FIG. 4) each have a stem 74 that is generally planar in shape, and a tip 76 connected to the outer end of stem 74 that is shaped to operably engage ridge 40 on lug nut 20 (FIG. 2). More particularly, the illustrated tip 76 includes an outwardly depressed portion 78 (FIG. 4) defining a channel to positively locate on ridge 40 of lug nut 20, and further includes an angled lead-in flange 80 for ramping tip 76 (and finger 18) outwardly onto engageable surface 41 during installation of wheel cover 10 so that each individual lug nut 20 can be received in the respective retainer 14.

A barb 82 (FIG. 4) is located on either edge 84 of each stem 74 at a distance D1 from central body 66, distance D1 being less than the distance D2 (FIG. 3) which is the height of outer wall 60. Barbs 82 (FIG. 3) define a shape roughly equivalent to, but slightly larger than, the inner diameter defined by outer wall 60. Thus, as retainer 14 is pressed within the space defined between outer wall 60 and protrusion 58 (FIG. 8), barbs 82 engage outer wall 60 to retain retainer 14 therein. Notably, the combination of barbs 70 engaging opposing sides of protrusion 58 and barbs 82 engaging opposing inner sides of outer wall 60 create a compensating system of retention where at least one set of barbs remains fully engaged despite differences in thermal expansion (or contraction) of the metal retainer 14 over the plastic wheel cover base 12. Further, the operation of barbs 70 and 82 permit retainers 14 to be quickly pressed onto wheel cover base 12 in a simplified and efficient manner. Thus, the assembled wheel cover 10 is assembled with a minimum of different type parts and without great expense. Of course, the retainers 14 could be insert molded, however, the illustrated method is contemplated to be the less expensive alternative.

Once wheel cover 10 is prepared as desired (e.g. painting or plating) and retainers 14 are assembled to wheel cover 12, wheel cover 10 can be installed onto vehicle wheel 16 (FIG. 2) by aligning fingertip angled flanges 80 with the respective lug nuts 20. Wheel cover 10 can then be pressed into place so that fingers 18 flex outwardly until fingertip depressed portions 78 positively engage ridges 40 on lug nuts 20.

As installed (FIG. 2), the illustrated rim 50 of wheel cover 10 is spaced from wheel 16 at location. This prevents rattling, and reduces stress that would be generated from an interference between rim 50 and wheel 16. Optimally, this also allows wheel cover 10 to be used on different wheels, such as wheel 16A (FIG. 10), wheel 16B (FIG. 13), and wheel 16C (FIG. 14). Also, the depth of fingers 18 on retainers 14 create clearance for receiving wheel retaining studs having different lengths, as illustrated by stud 28 (FIG. 2), stud 28A (FIG. 10) and stud 282 (FIG. 13).

A modified wheel cover 10A is shown in FIGS. 9–13. Similar features of wheel cover 10A to those corresponding with wheel cover 10 are referred to with similar number designations, but with the addition of the letter A. Also, the wheel cover 10A is shown with various wheels and lug nuts in FIGS. 10–13, which various wheels and lug nuts also have similar features designated by comparable numbers but with letters A, B and C added thereto.

Wheel cover 10A (FIG. 9) includes only three retainers 14A, thus reducing the total number of retainers 14A required per wheel cover, and further saving material in wheel cover base 12A by reducing the number of supporting structures 56A. Each retainer 14A (FIG. 11) includes modified fingers 18A, fingers 18a having an offset bend 90A about midway along stem 74A. Bend 90A is located a distance D3 from central body 66A, distance D3 being slightly greater than distance D2 so that bend 90A does not interfere with outer wall 60A. Optimally, bend 90A enlarges the pocket formed by fingers 18A so that retainer 14A can receive a lug nut 20A that is larger than the deepest part of the pocket formed by fingers 18A near the central body 66A. Advantageously, this construction allows outer wall 60A to be a smaller diameter and, hence, supporting structure 56 to be a smaller mass of plastic, thus further saving material and also facilitating molding. The illustrated fingertip 76A is also modified, fingertip 76A including an inwardly oriented depressed portion defining a circular inwardly facing ridge 92A. Ridge 92A is adapted to engage a depression or channel forming engageable surface 41A on lug nut 20A.

Lug nut 20A includes a slip washer 94A that engages wheel 16A, and further includes an outwardly extending ridge 40A on outer cylindrically-shaped surface 38A, washer 94A and ridge 40A forming the engageable surface 41A therebetween for receiving fingertip ridge 92A. Notably, with wheel cover 10A installed, fingertip 76A is captured in engageable surface 41A, thus positively locating wheel cover base 12A (and wheel cover base rim 50A) with respect to wheel 16A and leaving a space 83A between wheel 16A and wheel cover base rim 50A.

The three-pattern arrangement of retainers 14A on wheel cover 10 (FIG. 9) saves material, but places an increased load on the remote retainer compared to the other two more closely positioned retainers. To better fine-tune the retention strength at each location, the outer wall can be molded to a greater or lesser height to give a different amount of support to fingers 18A, thus changing the natural resiliency of the fingers. This is illustrated in FIGS. 11 and 12. In FIG. 11, outer wall 60A has a height of D2, while in FIG. 12, outer wall 60AI has a height of only D4. This difference in height changes the support given fingers 18A, thus changing their effective resilient length. This, in turn, changes the amount of force necessary to flex finger 18A, and thus varies the retention force of retainer 14A on lug nut 20A.

Wheel cover 10A can also be used on a different style steel wheel 16B, or on a different style wheel 16C and lug nut 20B (FIG. 14). Lug nut 20B is similar to lug nut 20A but does not include a rotatable slip washer 94A. Rather, lug nut 20B includes an angled wheel engaging surface 36B, and a ring-like ridge 40B spaced from surface 36B, ridge 40B being positioned spaced from but near to wheel engaging surface 36B so that when lug nut 20B is installed, there is a depression or engageable surface 41B formed between ridge 40B and the outer side of wheel 16B. Tip 76A engages this depression and abuts the inside of wheel 16B to positively locate wheel cover 10A on heel 16B. Lug nut 20B is characterized by the inclined wheel engaging outer surface 36B, which is not unlike surface 36 of lug nut 20.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A wheel cover comprising:
a wheel cover base including a front and back;
a plurality of wheel nut engaging retainers each including a nut embracing portion; and
a plurality of cups on the back of the wheel cover base, said cups each being defined by a wall extending at least partially around and embracing said retainer including a part of the axial length of said nut embracing portion, whereby the cup wall not only holds said retainer in place, but also stiffens said nut embracing portion thereof, yet leaves another part of said nut embracing portion projecting beyond said cup wall such that the other part can flex over a wheel nut.

2. A wheel cover as defined in claim 1 including a plurality of protrusions on the back of the wheel cover, one protrusion being located in each of said cups, said retainers each including an aperture for receiving said protrusion and further including first means for engaging said protrusion to retain said retainers in said cups.

3. A wheel cover as defined in claim 2 wherein said retainers include second means for engaging said cup to retain said retainers in said cups, said first and second means providing a desired level of retention in hot or cold environments despite different rates of thermal expansion between said base and said retainers.

4. A wheel cover as defined in claim 1 wherein at least one of said cups includes a wall of predetermined height that is different than the height of other of said cup walls, said wall of predetermined height supporting a different axial length of the nut embracing portion of the retainer embraced therein than the other walls thus creating different stiffnesses in said nut embracing portions of said retainers, whereby non-uniformly spaced cups are adapted to provide a balanced retention force for retaining the wheel cover on a vehicle wheel.

5. A wheel cover as defined in claim 1 wherein said wheel cover base is plastic and said retainers are metal.

6. A wheel cover as defined in claim 5 wherein said cups are cylindrically-shaped and said retainers are adapted to slip-fit into said cups.

7. A wheel cover as defined in claim 1 wherein said retainers are adapted to lie press-fit into said cups, and said retainers include means for retaining same therein.

8. A wheel cover as defined in claim 7 wherein said retainers are cup-shaped, and said nut embracing portion includes fingers defining the sides of the retainer cup-shape.

9. A wheel cover as defined in claim 8 wherein the fingers form a hexagonal shape.

10. A wheel cover as defined in claim 1 wherein said retainers are cup shaped, and said nut embracing portion includes fingers defining the sides of the retainer cup-shape.

11. A wheel cover as defined in claim 10 wherein the fingers form a hexagonal shape.

12. A wheel cover for a vehicle including a wheel and a plurality of lug nuts holding the wheel on the vehicle, the lug nuts each including an engageable surface for retaining a wheel cover on the vehicle, comprising:
a wheel cover base including a show surface adapted to aesthetically cover at least part of the vehicle wheel and a side opposite said show surface, said wheel cover base including protrusions extending from said side at locations corresponding to at least some of the lug nuts and further including a wall extending at least partially around each protrusion and forming a space therebetween; and
a plurality of cup-shaped retainers each including a planar central body shaped to fit within said space and fingers extending in a parallel fashion from the perimeter of said central body, said central body having an aperture of sufficient size to receive one of said protrusions and including first barbs positioned around said aperture to engage said one protrusion so that said central body resists being removed when positioned in said space, a portion of said fingers also being received into said space, said portion including second barbs shaped to engage the wall extending around said one protrusion so that said portion of said fingers resist being removed when positioned in said space, said fingers defining a pocket for receiving one of the lug nuts and further including a tip adapted to frictionally engage the engageable surface of the one lug nut, whereby said retainers are securely held on said wheel cover base in said space by said first and second barbs with a desirable minimum level of force in both hot and cold environments despite a difference of thermal expansion of the retainers and the wheel cover base.

13. A wheel cover as defined in claim 12 wherein said first and second barbs are oriented at an angle to allow press-fit insertion of said retainer central body into said space, but so that said first and second barbs bite into said protrusion and said outer wall and, hence, prevent removal of said retainer once inserted therein.

14. A wheel cover as defined in claim 13 wherein said outer wall extends continuously and forms a cylindrically-shaped ring around said protrusion.

15. A wheel cover as defined in claim 14 wherein said protrusion defines a ring-like inner wall that is concentric with said outer wall.

16. A wheel cover as defined in claim 15 wherein said wheel cover base includes an outer edge forming a rim, and said fingers each include a tip configured to positively engage the lug nut engageable surface to locate said rim in a positioned spaced from the wheel.

17. A wheel cover as defined in claim 16 wherein said tips each include an outwardly depressed portion defining an inwardly oriented channel adapted to engage a circular ridge-like engageable surface on the one lug nut.

18. A wheel cover as defined in claim 16 wherein said tip includes an inwardly depressed portion defining an inwardly oriented ridge adapted to engage a channel-like engageable surface on the one lug nut.

19. A wheel cover as defined in claim 12 wherein said walls support said fingers thus stiffening said fingers, and at least one of said walls is constructed to stiffen the fingers of a respective retainer a different amount than the remaining walls.

20. A wheel cover as defined in claim 12 wherein said first and second barbs are oriented at an angle to allow press-fit insertion of said retainer central body into said space, but are oriented to bite into said one protrusion and said associated wall to prevent removal of said retainer once inserted therein.

21. A wheel cover as defined in claim 12 wherein said wheel cover base includes an outer edge forming a rim, and said fingers each include a tip configured to positively engage the lug nut engageable surface to locate said rim in a position spaced from the wheel.

22. A wheel cover as defined in claim 12 wherein said tip includes an outwardly depressed portion defining an inwardly oriented channel adapted to engage a circular ridge-like engageable surface on the one lug nut.

23. A wheel cover as defined in claim 12 wherein said wheel cover base, said protrusions and said walls are molded as a unit from plastic, and wherein said retainers are formed from sheet metal and press-fit attached to said wheel cover base after molding said wheel cover base.

24. A wheel cover as defined in claim 12 wherein said retainers include an offset bend about midway along their length, said bend spacing the tips of the fingers outwardly to provide increased clearance for the lug nut to be received therein, thus permitting a reduction in size of the cylindrical walls required to receive the retainer central body.

25. A wheel cover for a vehicle including a wheel and further including a plurality of lug nuts for holding the wheel on the vehicle, comprising:
a wheel cover base adapted to aesthetically cover the wheel;
a plurality of retainers each including a plurality of resilient fingers extending generally in a common direction, said fingers having a length and a tip configured to releasably frictionally engage one of the lug nuts, said fingers having a natural unsupported stiffness and being adapted to resiliently bias said tip into engagement with one of the lug nuts to hold said wheel cover on the vehicle wheel; and
said wheel cover base including a plurality of cylindrically-shaped walls located on said wheel cover base in a spaced arrangement corresponding to several of the lug nuts, each of said shaped walls defining a space to closely receive one of said retainers and, in particular, a portion of the length of said fingers, one of said retainers being inserted into each of said spaces in said shaped walls so that said shaped walls support said fingers in a manner increasing the resilient stiffness in said fingers over the natural unsupported stiffness in said fingers as said fingers engage a particular lug nut, whereby said retainers hold said wheel cover on the vehicle wheel with a desired level of retention force.

26. A wheel cover as defined in claim 25 wherein a particular of said cylindrically-shaped walls supports a different portion of the length of said fingers of a particular of said retainers so that the retention force of the particular retainer is different from the remaining of said retainers, whereby a balanced retention force can be maintained to hold said wheel cover on the vehicle wheel even when the retainers are placed in a non-symmetrical arrangement on said wheel cover.

27. A wheel cover as defined in claim 26 including a pair of closely spaced retainers and a remote retainer creating a non-symmetrical arrangement of retainers, the cylindrically-shaped wall supporting the fingers of the remote retainer being shaped to increase the resilient stiffness of-same to a greater extent than the cylindrically-shaped walls supporting the fingers of the closely spaced retainers, whereby the closely spaced retainers and the remote retainer create a net balanced retention force that is functionally acceptable for service and for customer satisfaction despite the non-symmetrical arrangement of the retainers.

28. A wheel cover as defined in claim 25 wherein said retainers include an offset bend about midway along their length, said bend spacing the tips of the fingers outwardly to provide increased clearance for the lug nut to be received therein, thus permitting a reduction in size of the cylindrical walls required to receive the retainer.

29. A wheel cover as defined in claim 25 wherein said plurality of retainers are identical to each other.

30. A wheel cover as defined in claim 25 wherein said fingers define a hexagonal cup-shape, said fingers including edges supported by said cylindrically-shaped wall.

31. A retainer for retaining a wheel cover to a wheel on a vehicle, the vehicle wheel being secured to the vehicle by a plurality of lug nuts, the lug nuts each having one of a groove and a ridge extending around the lug nut, comprising:
- a planar central body including material defining an aperture, said material including first barbs extending inwardly around said aperture which are angled with respect to the plane of said central body to permit a closely fitting protrusion to be extended through said aperture slideably past said first barbs but which are adapted to bite into the protrusion to prevent removal of the retainer once inserted therein; and
- a plurality of fingers connected to said central body extending generally perpendicular to said central body so as to form a cup-shape, said plurality of fingers each including a length with side edges and a tip, one or both of said edges including a second barb extending outwardly, said second barbs defining an angled surface with respect to said finger to permit the retainer to be inserted into a closely fitting cylindrical sleeve-like wall with the wall extending slideably past said second barbs around at least a portion of said plurality of fingers but which second barbs are adapted to bite into the cylindrical sleeve-like wall to prevent the retainer from being removed once inserted, said tips including means for frictionally engaging the one groove or ridge on the lug nut, whereby high strength retainers can be securely attached to the wheel cover by being pressed thereon, and further can continue to be attached thereto with a predetermined minimum retention force in hot or cold environments despite any difference in thermal expansion between the retainer and the wheel cover base to which the retainer is to be attached.

32. A retainer as defined in claim 31 wherein said tips include an outwardly depressed portion defining a channel adapted to engage a circular ridge on the lug nuts.

33. A retainer as defined in claim 31 wherein said tips include an inwardly depressed portion defining a circular ridge adapted to engage a groove defined in one of the lug nuts or defined by one of the lug nuts and the wheel.

34. A retainer as defined in claim 31 wherein said fingers include an offset bend along their length, said bend being located about midway along the length of each finger and permitting said central body to be reduced in size smaller than the lug nut to be received in the retainer.

35. A method of manufacturing a wheel cover, comprising:
- providing a wheel cover base including at least one protrusion and an associated wall, said protrusion and said wall extending from one side of the base, said protrusion and said wall defining a space therebetween;
- providing cup-shaped retainers shaped to fit partially into said space and including barbs shaped to engage said protrusion and wall once installed, said retainers being adapted to releasably frictionally engage a vehicle wheel lug nut; and
- pressing the retainers into the space, the barbs of said retainers slideably engaging said protrusion and said wall in a first direction but biting into said protrusion and said wall in a second direction opposite the first direction so that the retainer are not removable once installed.

36. A method as defined in claim 35 including injection molding said wheel cover base, said protrusion and said wall as a unit.

37. A method of manufacturing a wheel cover, comprising:
- providing a wheel cover base including at least one protrusion and an associated wall, said protrusion and said associated walls extending from one side of the base, each said protrusion and said associated wall defining a space therebetween; said wheel cover base, said protrusions and said walls being injection molded as a unit;
- providing a plurality of cup-shaped retainers each shaped to fit partially into said space and including barbs shaped to engage said protrusion and wall once installed, said retainers including a wheel nut engaging portion adapted to releasably frictionally engage a vehicle wheel lug nut, said walls supporting said wheel nut engaging portion when said retainers are assembled into said space;
- pressing the retainers into the space, the retainers each slideably engaging a selected of said protrusion and said walls in a first direction but biting into said selected protrusion and said wall in a second direction opposite the first direction so that the retainers are not removable once installed; and
- varying the height of individual of said walls to vary the retention strength of said wheel nut engaging portions as desired.

38. A method as defined in claim 37 wherein said walls are irregularly spaced on said wheel cover base, and are varied in height so as to provide a balanced retention of said wheel cover on a vehicle wheel.

39. A wheel cover for a vehicle including a wheel and a plurality of lug nuts holding the wheel on the vehicle, the lug nuts each including an engageable surface for retaining a wheel cover on the vehicle, comprising:
- a molded plastic wheel cover base including a show surface adapted to aesthetically cover at least part of the vehicle wheel;
- a plurality of metal cup-shaped retainers including lug nut engaging fingers constructed to engage the engageable surface of a selected lug nut; and
- means for retaining said retainers on said wheel cover base in positions corresponding to at least some of the lug nuts, said means including a plurality of cup-shaped members on said base and further including barbs on said retainers for permanently engaging said cup-shaped members.

40. A wheel cover as defined in claim 39 wherein each of said cup-shaped members are integrally molded as part of said wheel cover base.

41. A wheel cover as defined in claim 39 wherein said retainers define a hexagonal shape, and said cup-shaped members each define a cylindrical shape adapted to receive said retainer hexagonal shape.

42. A wheel cover for a vehicle including a wheel and a plurality of lug nuts holding the wheel on the vehicle, the lug nuts each including an engageable surface for retaining a wheel cover on the vehicle, comprising:
- a molded plastic wheel cover base including a show surface adapted to aesthetically cover at least part of the vehicle wheel;
- a plurality of metal cup-shaped retainers adapted to engage the engageable surface of a selected lug nut; and
- means for retaining said retainers on said wheel cover base in positions corresponding to at least some of the lug nuts, said retainers each including fingers adapted to frictionally engage the lug nuts, and said means for retaining including a wall supporting said fingers to increase the frictional force of engagement of said fingers on the lug nuts over an unsupported frictional force of engagement, thus increasing the overall force of retention of the wheel cover of the vehicle wheel.

43. A wheel cover as defined in claim 42 wherein said retainers are identical in shape but said walls are varied in height to increase or decrease the frictional force of engagement of said fingers as desired.

44. A wheel cover for a vehicle including a wheel and a plurality of lug nuts holding the wheel on the vehicle, the lug nuts each including an engageable surface for retaining a wheel cover on the vehicle, comprising:

a molded plastic wheel cover base including a show surface adapted to aesthetically cover at least part of the vehicle wheel;

a plurality of metal cup-shaped retainers adapted to engage the engageable surface of a selected lug nut; and means for retaining said retainers on said wheel cover base in positions corresponding to at least some of the lug nuts, said retainers each including first opposing barbs for gripping said means for retaining and second opposing barbs for gripping said means for retaining in a direction different than said first opposing barbs so that said first and second opposing barbs maintain a minimum level of retention in hot and cold environments despite differences in thermal expansion between the base and the retainers.

* * * * *

UNITED STATES PATENT AND TRADEMARK OFFICE
CERTIFICATE OF CORRECTION

PATENT NO. : 5,297,854
DATED : March 29, 1994
INVENTOR(S) : Gerald A. Nielsen et al.

It is certified that error appears in the above-indentified patent and that said Letters Patent is hereby corrected as shown below:

Column 1, line 30;
"-resolve" should be --resolve--.

Column 2, line 25;
"he" should be --the--.

Column 4, line 36;
"-this" should be --this--.

Column 4, line 42;
"282" should be --28B--.

Column 5, line 28;
"60AI" should be --60A'--.

Column 6, line 32;
"to lie" should be --to be--.

Column 8, line 45;
"of-same" should be --of same--.

Column 9, line 67;
"retainer" should be --retainers--.

Column 10, lines 6 & 7;
"at least one protrusion and an associated wall, said protrusion" should be --a plurality of protrusions and associated walls, said protrusions--.

Column 10, line 21;
"space" should be --spaces--.

UNITED STATES PATENT AND TRADEMARK OFFICE
CERTIFICATE OF CORRECTION

PATENT NO. : 5,297,854

DATED : March 29, 1994

INVENTOR(S) : Gerald A. Nielsen et al.

It is certified that error appears in the above-indentified patent and that said Letters Patent is hereby corrected as shown below:

Column 10, lines 22 & 23;
 "protrusion" should be --protrusions--.

Column 10, line 24;
 After "and" delete --said--.

Signed and Sealed this

Twentieth Day of September, 1994

Attest:

BRUCE LEHMAN

Attesting Officer            Commissioner of Patents and Trademarks